(12) United States Patent
Block et al.

(10) Patent No.: US 7,283,689 B1
(45) Date of Patent: Oct. 16, 2007

(54) OPTICAL WAVEGUIDE HAVING HIGH DIELECTRIC CONSTANT CONTRAST BETWEEN CLADDING AND CORE

(75) Inventors: Bruce A. Block, Portland, OR (US); Paul Davids, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/479,298

(22) Filed: Jun. 29, 2006

(51) Int. Cl.
*G02F 1/035* (2006.01)

(52) U.S. Cl. .................. 385/2; 385/1; 385/14; 385/39; 385/40; 385/27; 385/28; 385/129; 385/130; 385/131

(58) Field of Classification Search .............. 385/129, 385/130, 131, 132, 14, 1, 2, 8, 9, 39, 40, 385/144, 145, 901, 27, 28
See application file for complete search history.

(56) References Cited

U.S. PATENT DOCUMENTS

| | | | |
|---|---|---|---|
| 6,895,162 B2 * | 5/2005 | Bintz et al. ................ | 385/142 |
| 6,937,811 B2 * | 8/2005 | Bintz et al. ................ | 385/143 |
| 6,993,212 B2 | 1/2006 | Block et al. ................ | 383/3 |
| 7,200,308 B2 * | 4/2007 | Hochberg et al. ........... | 385/122 |
| 7,206,490 B2 * | 4/2007 | Bintz et al. ................ | 385/143 |
| 2002/0106175 A1 * | 8/2002 | Binkley et al. ............. | 385/132 |
| 2004/0096179 A1 * | 5/2004 | Bintz et al. ................ | 385/142 |
| 2004/0096180 A1 * | 5/2004 | Bintz et al. ................ | 385/143 |

OTHER PUBLICATIONS

Liao, Ling et al., "High speed silicon Mach-Zehnder modulator," Optics Express, vol. 13, No. 8, Apr. 18, 2005, pp. 3129-3135.

* cited by examiner

*Primary Examiner*—Brian M. Healy
(74) *Attorney, Agent, or Firm*—Blakely, Sokoloff, Taylor & Zafman LLP

(57) ABSTRACT

According to embodiments of the present invention, an optical waveguide includes a high dielectric constant core material relative to the cladding material. The cladding material has an index of refraction that is adjustable in response to an electrical stimulus.

17 Claims, 5 Drawing Sheets

OPTICAL WAVEGUIDE HAVING HIGH DIELECTRIC CONSTANT CONTRAST BETWEEN CLADDING AND CORE

BACKGROUND

1. Field

Embodiments of the present invention relate to optical devices and, in particular, to optical waveguides.

2. Discussion of Related Art

In general, waveguides may be used to carry electromagnetic waves including electromagnetic waves at optical frequencies. Traditional optical waveguides have limitations, however.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF EMBODIMENTS

Figure 1:
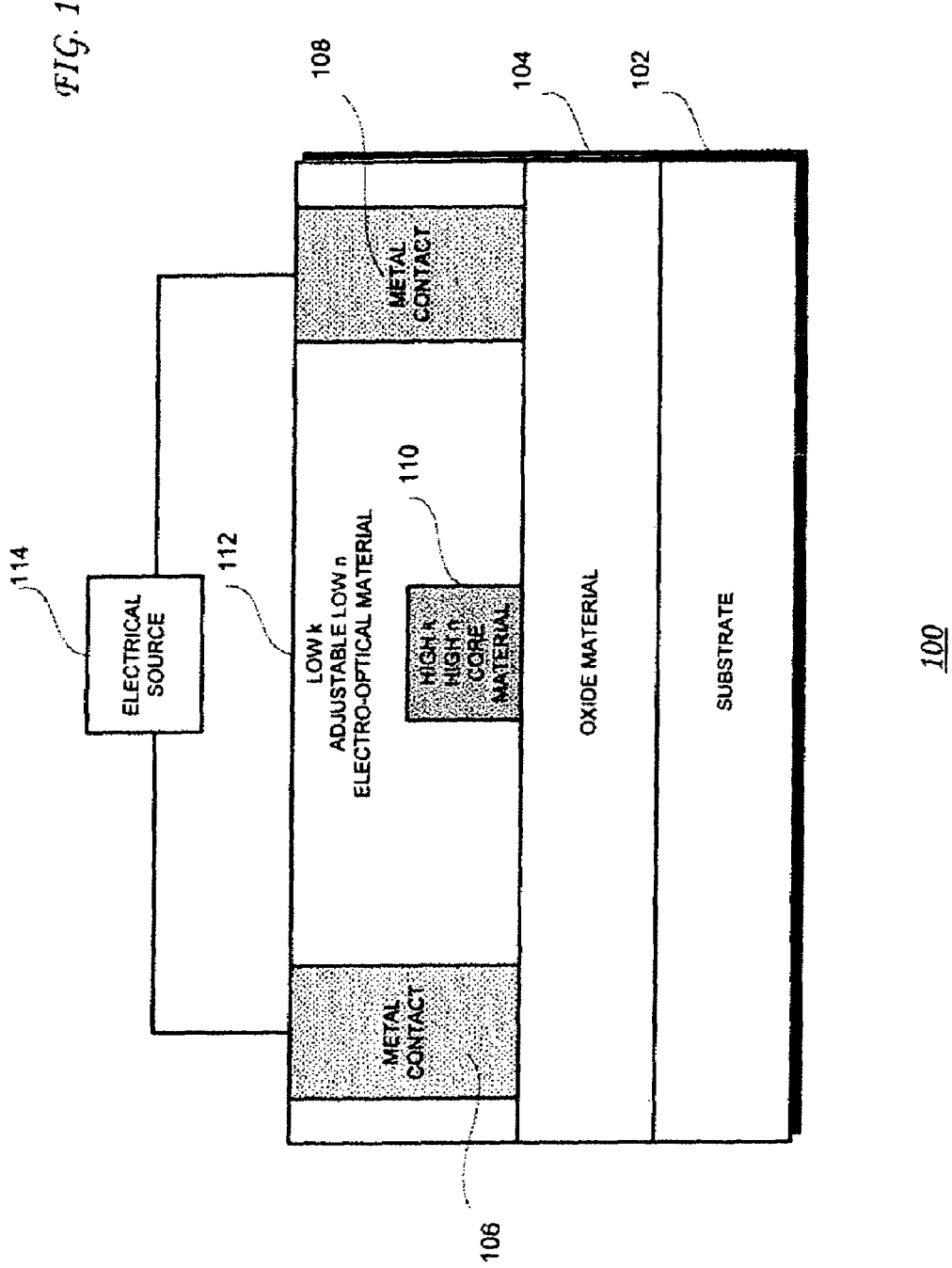
FIG. 1 is a perspective diagram of an optical waveguide according to an embodiment of the present invention.

FIG. 1 is a perspective diagram of an optical waveguide 100 according to an embodiment of the present invention. In the illustrated embodiment, the optical waveguide includes a base or substrate 102. A lower cladding material 104 is disposed on the substrate 102. Contacts 106 and 108, waveguide core material 110, and an upper cladding material 112 are disposed on the lower cladding material 104. An electrical source 114 is coupled to the contacts 110 to apply an electrical stimulus to the waveguide 100.

In the illustrated embodiment, the upper cladding material 112 surrounds the top and sides of the core material 110 and the lower cladding material 104 is in contact with the bottom of the core material 110. The contacts 106 and 108 contact the sides of the upper cladding material 112.

In one embodiment, the substrate 102 may be a silicon (Si) substrate. For other embodiments, the substrate 102 may be formed from another semiconductor material or any other suitable substrate such as quartz or glass, for example.

In some embodiments, the lower cladding material 104 may be any suitable electrically insulating material, such as an oxide material. For example, the lower cladding material 104 may include silicon oxide ($SiO_2$). In other embodiments, the lower cladding material 104 may be any suitable nitride material, such as silicon nitride ($Si_3N_4$), for example. In this embodiment, the index of refraction may be lower than that of the waveguide core material 110 so that guiding of the wave may occur.

For some embodiments, the two contacts 106 and 108 may be made from a metal material. For other embodiments, the two contacts 106 and 108 may be made from other electrically conductive material, such as polysilicon, for example. The contacts 106 and 108 may be spaced as closely together as approximately three micrometers (~3 µm).

The waveguide core material 110 may be made from a material that has a high index of refraction ($n_{core}$). Suitable materials include an un-doped semiconductor material (e.g., silicon (Si)), titanium oxide, hafnium oxide, niobium oxide, barium strontium titanate, lead titanate, and/or the like.

The upper cladding material 112 may be made from an electro-optic material that has a relatively low index of refraction ($n_{clad}$). Suitable materials include any electro-optic material, such as an electro-optic polymer (e.g., a host electro-optic system doped with a chromophore).

The electrical source 114 may apply an operating voltage to the waveguide 100, including the upper cladding material 112, that is compatible with complementary metal-oxide-semiconductor (CMOS)-technology. For example, the electrical source 114 may apply an operating voltage of 1.2 volts to the waveguide 100, including the upper cladding materials 112.

For some embodiments, if no electrical stimulus is applied to operate the waveguide 100 the index of refraction (n) of the waveguide core material 110 may be up to or even greater than four (for example, $n_{core}$~2.3), the index of refraction (n) of the upper cladding material 112 may be in a range of 1.4 to 1.6 (for example, $n_{clad}$~1.5), and thus the index of refraction contrast between the upper cladding material 112 and the waveguide core material 110 (Δn) takes on the first value minus the second value ($\Delta n = n_{core} - n_{clad}$). Because the upper cladding material 112 is an electro-optic material, if an electrical stimulus is applied to the contacts 106 the index of refraction (n) of the upper cladding material 112 may change resulting in a change in the effective index ($n_{eff}$). The effective index ($n_{eff}$) is the ratio of phase velocity of the light in a vacuum to the phase velocity in the waveguide 100.

In some embodiments, waveguide core material 110 may have a high a high dielectric constant ($k_{core}$) and the upper cladding material 112 may have a relatively low dielectric constant ($k_{clad}$). For example, the waveguide core material 110 may have a dielectric constant ($k_{core}$) of up to or even greater than four ($k_{core} \geq 4$) and the upper cladding material 112 may have a dielectric constant ($k_{clad}$) of between two and four ($k_{clad}$~2-4).

Figure 2:
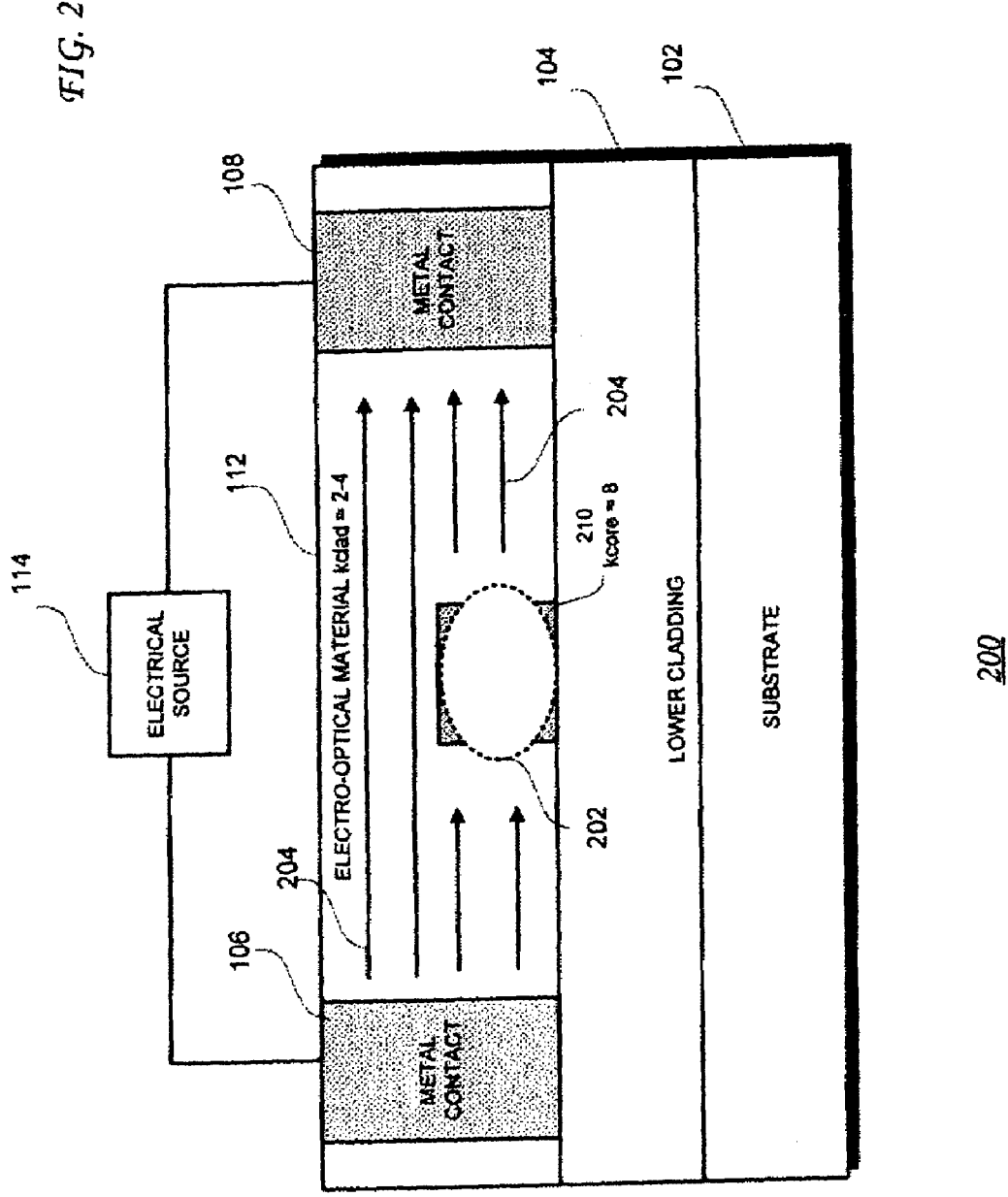
FIG. 2 is a perspective diagram illustrating an optical mode in optical waveguide according to an embodiment of the present invention.

FIG. 2 is a perspective diagram illustrating operation of an optical waveguide 200 according to an embodiment of the present invention. In the illustrated embodiment, the waveguide core material 210 has a dielectric constant of eight ($k_{core}$=8) and the upper cladding material 112 has a dielectric constant of two to four ($k_{clad}$=2-4). The dielectric constant contrast between the waveguide core material 210 and the upper cladding material 112 (Δk) is thus between four and six (Δk=4-6). Also, assume for purposes of illustration that if the waveguide 200 is un-stimulated the index of refraction of the waveguide core material 210 is 2.3 ($n_{core}$=2.3), the index of refraction of the upper cladding material 112 is 1.5 ($n_{clad}$=1.5), and the index of refraction contrast between the upper cladding material 112 and the waveguide core material 210 (Δn) is thus 0.8 (Δn=0.8).

In the above scenario, the optical waveguide 200 may operate as follows. An optical signal is directed into the waveguide 200. A dashed line 202 indicates the optical mode of the optical signal with the waveguide 200 un-stimulated. The electrical source 114 applies a voltage to the waveguide 200 including the upper cladding 112 via the contacts 106 and 108 to establish an electrical field between the contacts 106 and 108 to modulate the effective index ($n_{eff}$) of the optical mode passing through the waveguide 200. The arrows 204 indicate the electrical field.

The electrical field causes the index of refraction of the upper cladding material 112 ($n_{clad}$) to change due to the electro-optic effect of the upper cladding material 112, resulting in a changed effective index ($n_{eff}$) Also, in embodiments of the present invention in addition to the index of refraction contrast changing between the cladding and core, the change in effective index ($n_{eff}$) may be exploited when implementing an optical modulator. Also, as the dielectric constant contrast between the waveguide core material 210 and the upper cladding material 112 ($\Delta k$) increases the index of refraction contrast between the upper cladding material 112 and the waveguide core material 210 ($\Delta n$) increases. That is, both the electric field and the dielectric constant contrast between the waveguide core material 210 and the upper cladding material 112 ($\Delta k$) may have an effect on the index of refraction contrast between the upper cladding material 112 and the waveguide core material 210 ($\Delta n$). Thus embodiments of the present invention use a material for the waveguide core material 210 that has both a higher index of refraction than the upper cladding material 112 and a higher dielectric constant than the upper cladding material 112.

Because there is a low dielectric constant material in the upper cladding 112 and a higher dielectric constant material waveguide core 210, for example, the electric field may be more concentrated around the upper cladding material 112 and less concentrated around the waveguide core material 210. This can be seen when solving for Poisson's equation to determine the electrical potential for a given charge in the upper cladding material 112. After reading the description herein, a person of ordinary skill in the relevant art will readily recognize how to solve Poisson's equation to determine the electrical potential for a given charge in the upper cladding material 112 according to embodiments of the present invention.

Also, the optical signal may have a smaller optical mode, indicated by a dashed line 206. The optical mode may be somewhat confined to the waveguide core material 210. In this embodiment, a liquid crystal polymer may be used as the upper cladding material instead of an EO polymer.

Figure 3:
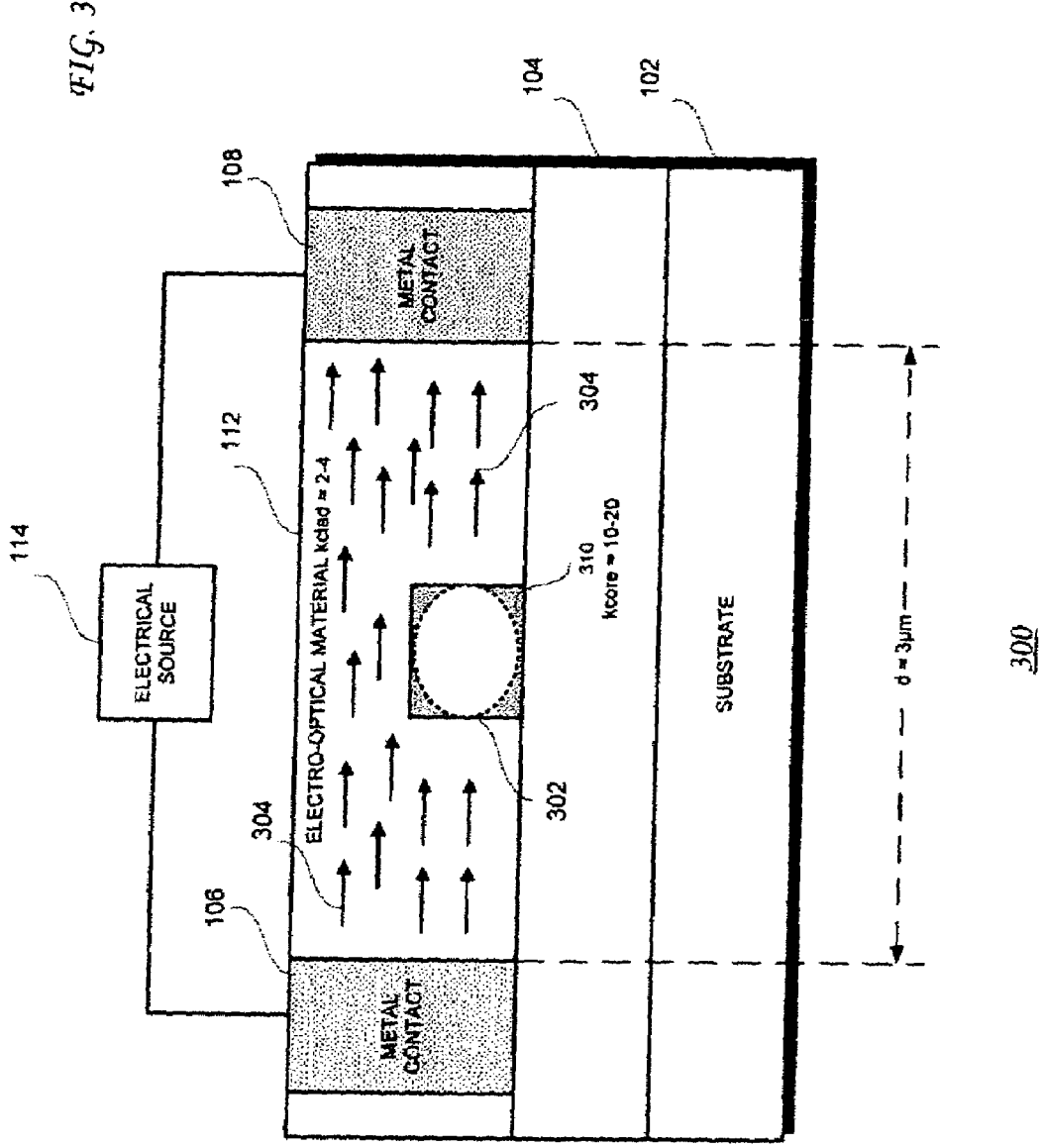
FIG. 3 is a perspective diagram illustrating an optical mode in optical waveguide according to an alternative embodiment of the present invention.

FIG. 3 is a perspective diagram illustrating operation of an optical waveguide 300 according to an embodiment of the present invention in which the waveguide core material 310 has a dielectric constant of ten or even twenty ($k_{core}$=10-20), for example, and the upper cladding material 112 has a dielectric constant of two to four ($k_{clad}$=2-4). The dielectric constant contrast between the waveguide core material 310 and the upper cladding material 112 ($\Delta k$) is thus between six and eighteen ($\Delta k$=6-18).

Note that the distance between the contacts 106 and 108 in the waveguide 300 may be approximately three or more micrometers ($\geq 3$ μm). As the optical mode becomes smaller, the spacing between the contacts 106 and 108 can become closer. As the spacing of the contacts 106 and 108 becomes closer, the electrical field between the contacts 106 and 108 may become stronger. As the electrical field between the contacts 106 and 108 becomes stronger and as the dielectric constant contrast between the waveguide core material 310 and the upper cladding material 112 ($\Delta k$) becomes larger, the index of refraction contrast between the upper cladding material 112 and the waveguide core material 310 ($\Delta n$) may become greater.

If, as a result of the greater dielectric constant contrast between the waveguide core material 310 and the upper cladding material 112 ($\Delta k$), for example, the index of refraction contrast between the upper cladding material 112 and the waveguide core material 310 ($\Delta n$) becomes greater, the performance of the waveguide 300 as an optical modulator may become enhanced Of course, as described above, some embodiments of the present invention use a material for the waveguide core material 210 that has both a higher index of refraction than the upper cladding material 112 and a higher dielectric constant than the upper cladding material 112.

The optical waveguide 300 may operate as follows. An optical signal is directed into the waveguide 300. A dashed line 302 indicates the optical mode of the optical signal with the waveguide 300 un-stimulated. The electrical source 114 applies a voltage to the waveguide 300 and upper cladding via the contacts 106 and 108 to establish an electrical field between the contacts 106 and 108 to modulate the effective index ($n_{eff}$) of the optical signal passing through the waveguide 300. The arrows 304 indicate the electrical field. The electrical field causes a changed index of refraction of the upper cladding material 112. This in turn changes the effective index ($n_{eff}$) of the optical waveguide mode.

The higher dielectric constant contrast between the waveguide core material 310 and the upper cladding material 112 ($\Delta k$) may cause the electric field in the waveguide 300 to be more concentrated around the upper cladding material 112 and less concentrated around the waveguide core material 310 than is the case with a lower dielectric constant waveguide core or higher dielectric constant cladding. Also, the optical signal in the waveguide 300 may have a smaller optical mode, indicated by a dashed line 306, which may be almost entirely confined to the waveguide core material 310.

Of course, the values used for index of refraction and dielectric constant are only examples and other values may be used. Also, the waveguides described herein may be ridge waveguides, planar waveguides, or other waveguides.

Figure 4:
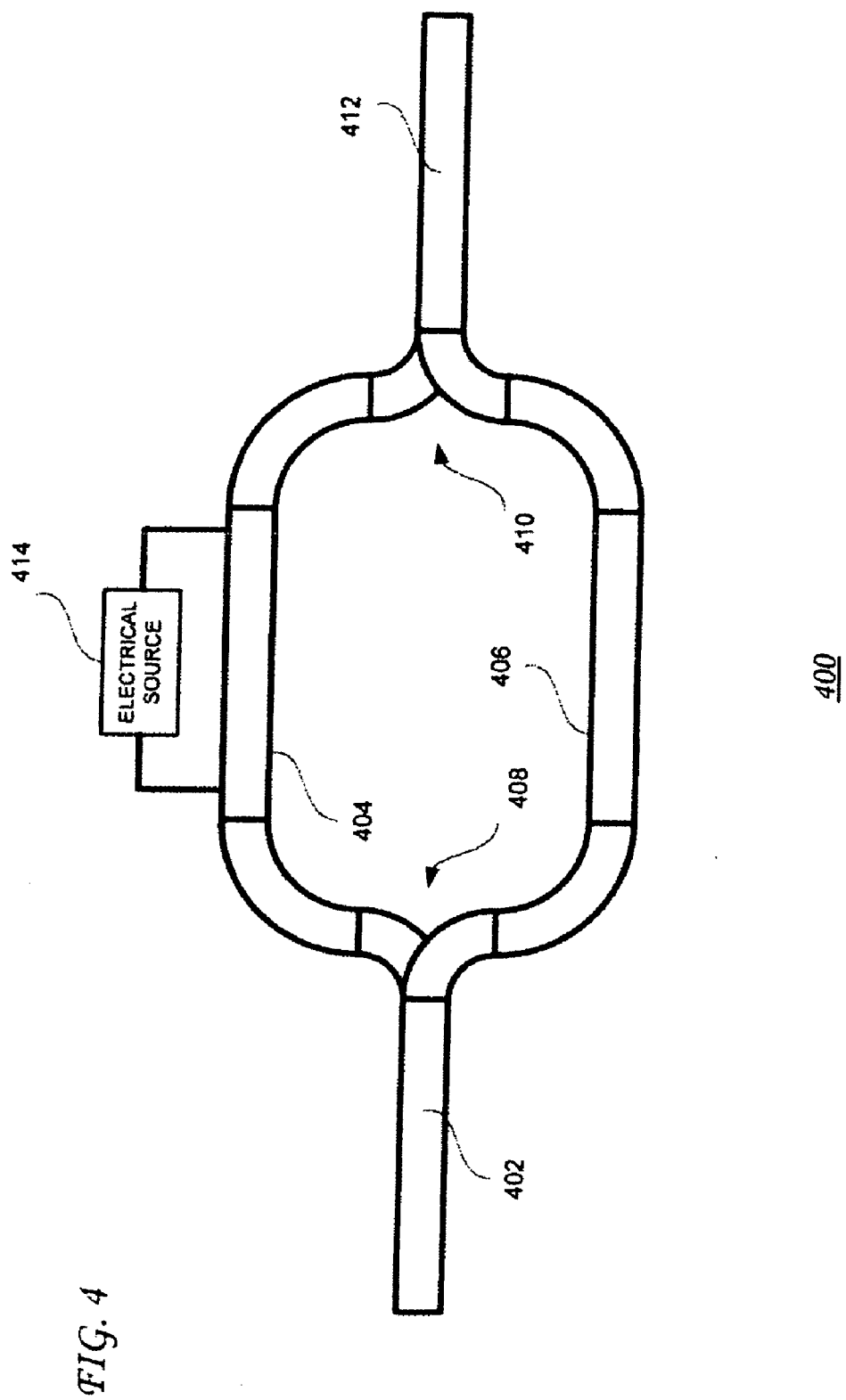
FIG. 4 is a perspective diagram of an optical modulator according to an embodiment of the present invention.

FIG. 4 is a perspective diagram of an optical modulator 400 according to an embodiment of the present invention. The optical modulator may be a Mach Zehnder optical modulator in that it includes a single input waveguide 402 is split into two waveguides or arms 404 and 406, by a 3 dB Y junction 408, for example, and then recombined by a second 3 dB Y junction 410 into a single output waveguide 412. For some embodiments, the arms 404 and/or 406 may include the waveguide 100, 200, 300, or other waveguide fabricated in accordance with embodiments of the present invention.

An electrical signal source and/or radio frequency (RF) source 414 is coupled to the arm 404 and may apply a signal to the contacts in the waveguide 404 to modulate the effective index ($n_{eff}$) of optical signal propagating in the waveguide 404. The change in effective index ($n_{eff}$) will cause a change of the optical phase of the light relative to the other arm and when the two signals are combined the difference in phases between the two arms 404 and 406 results in change in the optical intensity at the output waveguide 412 depending on whether constructive or destructive interference occurs. When no voltage is applied and the arms 404 and 406 are balanced, constructive interference occurs.

Figure 5:
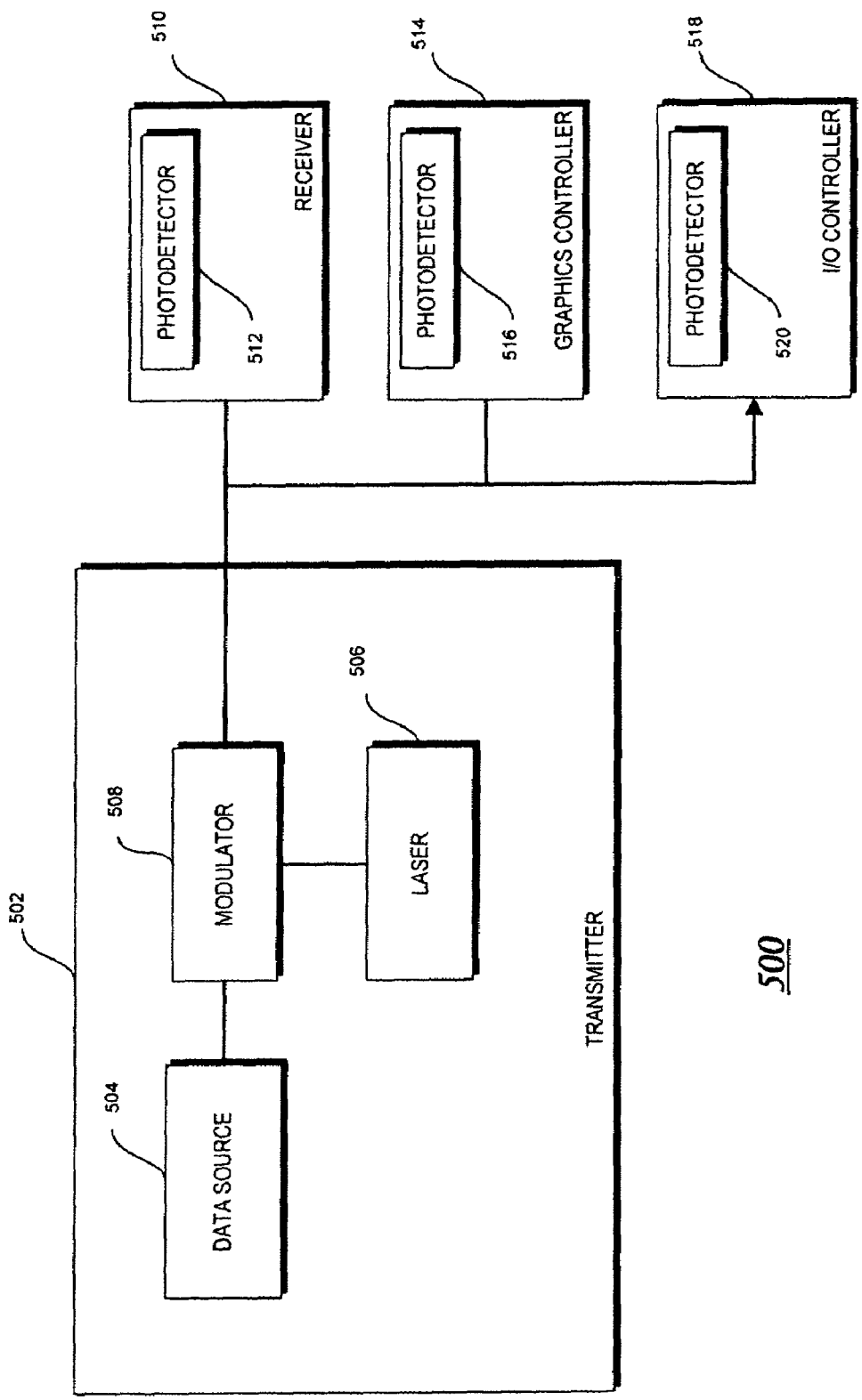
FIG. 5 is a simplified block diagram of an optical system according to an embodiment of the present invention.

FIG. 5 is a simplified block diagram of an optical system 500 according to an embodiment of the present invention. In the illustrated embodiment, the system 500 includes transmitter 502 coupled to circuitry to receive an optical signal. The illustrated transmitter 502 includes a data source 504 coupled to a modulator 508, which is coupled to a laser 506. The laser provides a continuous wave (CW) source of light to the modulator 508. The data source 504 may provide a data signal to the modulator 508, which may convert the electrical data signal from the data source 504 to an optical signal on the CW light. The optical modulator 508 may modulate the optical signal to provide a carrier for the optical signal. For some embodiments, the optical modulator 508 may include the optical modulator 400, or other optical modulator fabricated in accordance with embodiments of the present invention, such as a ring modulator, a Fabry Perot modulator, etc.

The modulated optical signal may be transmitted to a receiver 510, which may convert the optical signal back to an electrical signal using the photodetector 512. The receiver 510 may process the electrical signal.

The modulated optical signal may be transmitted to a graphics controller 514, which may convert the optical signal back to an electrical signal using the photodetector 516. The graphics controller 514 may process the electrical signal which may be commands and data to generate display signals (e.g., in RGB format).

The modulated optical signal may be transmitted to an input/output (I/O) controller 518, which may convert the optical signal back to an electrical signal using the photodetector 520. The I/O controller 510 may process the electrical signal which may be commands and data to control peripheral devices (not shown).

In some embodiments, the transmitter 502 may be on the same chip as the receiver 510, the graphics controller 514, and/or the I/O controller 518. In other embodiments, the transmitter 502 may be on the same board as the receiver 510, the graphics controller 514, and/or the I/O controller 518 but on a different chip. In still other embodiments, the transmitter 502 may be on a different board as the receiver 510, the graphics controller 514, and/or the I/O controller 518.

Embodiments of the present invention may be implemented using hardware, software, or a combination thereof. In implementations using software, the software or machine-readable data may be stored on a machine-accessible medium. The machine-readable data may be used to cause a machine, such as, for example, a processor (not shown) to perform the process 300. A machine-readable medium includes any mechanism that may be adapted to store and/or transmit information in a form accessible by a machine (e.g., a computer, network device, personal digital assistant, manufacturing tool, any device with a set of one or more processors, etc.). For example, a machine-readable medium includes recordable and non-recordable media (e.g., read only (ROM), random access (RAM), magnetic disk storage media, optical storage media, flash devices, etc.), such as electrical, optical, acoustic, or other form of propagated signals (e.g., carrier waves, infrared signals, digital signals, etc.).

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

The invention claimed is:

1. An apparatus, comprising:
    a waveguide having:
        a core material having a dielectric constant and an index of refraction;
        a cladding material in contact with the core material, the cladding material having a dielectric constant substantially lower than the dielectric constant of the core material, the cladding material having an index of refraction lower than the index of refraction core material, the cladding material being responsive to an electrical stimulus, the index of refraction of the cladding material to change in response to the electrical stimulus;
    a first electrode in contact with a first end of the cladding material; and
    a second electrode in contact with a second end of the cladding material, wherein the first and the second electrodes are positioned less than approximately ten micrometers apart.

2. The apparatus of claim 1, wherein the cladding material comprises electro-optic material.

3. The apparatus of claim 2, wherein the cladding material comprises an electro-optical polymer.

4. The apparatus of claim 3, wherein the cladding material comprises a host polymer system doped with a chromophore.

5. The apparatus of claim 1, wherein the core material comprises at least one of a semiconductor material, titanium oxide material, hafnium oxide material, or niobium oxide material, strontium barium titanate material, or lead titanate material.

6. The apparatus of claim 1, further comprising a source of electricity to apply the electrical stimulus to the cladding via the first and second electrodes.

7. The apparatus of claim 1, wherein the cladding material, the core material, and the first and second contacts are disposed on a second cladding material.

8. The apparatus of claim 7, wherein the second cladding material is an oxide material.

9. The apparatus of claim 7, wherein the second cladding material is disposed on a substrate fabricated with an integrated circuit.

10. The apparatus of claim 9, wherein the integrated circuit is a CMOS circuit, and wherein the core and cladding materials are compatible with a CMOS fabrication process.

11. The apparatus of claim 10, wherein the core material, first and second cladding materials, and the substrate form at least a portion of an optical modulator.

12. A system, comprising:
    an optical modulator to output an optical signal, the optical modulator having at least one waveguide, the waveguide having a core material having a dielectric constant and an index of refraction, and a cladding material in contact with the core material, the cladding material having a dielectric constant substantially lower than the dielectric constant of the core material, the cladding material having an index of refraction lower than the index of refraction core material, the cladding material being responsive to an electrical stimulus, the index of refraction of the cladding material to change in response to the electrical stimulus; and a graphics controller having a photodetector to receive the optical signal from the optical modulator.

13. The apparatus of claim 12, wherein the index of refraction of the cladding material differs from the index of refraction of the core material from about one to two.

14. The apparatus of claim 12, wherein the dielectric constant of the cladding material is approximately two to 4 and wherein the dielectric constant of the core material is at least approximately ten.

15. A method, comprising:

directing an optical signal to an optical modulator, the optical modulator having a first arm and a second arm, an individual arm having a core material and a cladding material, the core material and the cladding material each having a dielectric constant, the dielectric constant of the cladding being substantially lower than the dielectric constant of the core material;

splitting the optical signal between the first arm and the second arm;

increasing an index of refraction contrast between the cladding material and the core material in the first arm by applying an electrical stimulus to the first arm; and decreasing a size of an optical mode of the optical signal in response to increasing the index of refraction contrast in the first arm.

16. The method of claim 15, further comprising applying an electrical stimulus of approximately 1.2 volts to the first arm.

17. The method of claim 15, further comprising substantially confining the optical mode to the cladding material of the first arm.

* * * * *